(12) United States Patent
Lalla et al.

(10) Patent No.: US 7,698,609 B2
(45) Date of Patent: Apr. 13, 2010

(54) PROCESS MEASURING DEVICE WITH EXPANDED HARDWARE ERROR DETECTION

(75) Inventors: Robert Lalla, Lörrach (DE); Axel Humpert, Rheinau (DE); Jean Luc Gesser, Illfurth (FR); Arno Goetz, Mahlberg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 680 days.

(21) Appl. No.: 10/584,302

(22) PCT Filed: Dec. 15, 2004

(86) PCT No.: PCT/EP2004/053514

§ 371 (c)(1),
(2), (4) Date: Apr. 2, 2007

(87) PCT Pub. No.: WO2005/064424

PCT Pub. Date: Jul. 14, 2005

(65) Prior Publication Data

US 2007/0273508 A1 Nov. 29, 2007

(30) Foreign Application Priority Data

Dec. 23, 2003 (DE) ................. 103 61 465

(51) Int. Cl.
*G01R 31/28* (2006.01)
*G06F 11/10* (2006.01)
*G06F 3/00* (2006.01)

(52) U.S. Cl. .................. 714/724; 714/807; 702/127
(58) Field of Classification Search .............. 714/724, 714/740, 742, 758, 807, 799; 324/460, 500, 324/522; 702/108, 116, 127, 130
See application file for complete search history.

(56) References Cited

U.S. PATENT DOCUMENTS

| 5,966,305 | A | 10/1999 | Watari |
| 7,284,428 | B1 * | 10/2007 | Hoben et al. ............... 340/612 |
| 7,470,060 | B1 * | 12/2008 | Hoben et al. ............... 374/143 |
| 7,478,006 | B2 * | 1/2009 | Odom ..................... 702/127 |
| 2003/0188221 | A1 | 10/2003 | Rasmussen |

FOREIGN PATENT DOCUMENTS

| EP | 0 766 156 A1 | 4/1997 |
| WO | WO 02/05199 A1 | 1/2002 |

* cited by examiner

*Primary Examiner*—Phung M Chung
(74) *Attorney, Agent, or Firm*—Bacon & Thomas, PLLC

(57) ABSTRACT

A process measuring device including: A first processor, which performs a measured value processing with a first algorithm in first processing cycles; and a second processor, which is responsible for coordination and/or communication tasks. The second processor reads, in time intervals which are greater than the first processing cycle, a control data set from the first processor, and executes the first algorithm on the basis of the control data set, in order to verify the correct functioning of the first processor.

10 Claims, 2 Drawing Sheets

PROCESS MEASURING DEVICE WITH EXPANDED HARDWARE ERROR DETECTION

FIELD OF THE INVENTION

The present invention relates to a process measuring device, especially a process measuring device with expanded hardware error detection.

BACKGROUND OF THE INVENTION

Certification of a process measuring device according to the standard IEC61508 (SIL2) requires that possibly occurring hardware defects of higher probability be detected and signaled on a measured value receiver as an error state. The statistical fraction of errors, which lead to a correct signalling of the error state on the measured value receiver, is referred to as the SFF (Safe Failure Fraction).

SUMMARY OF THE INVENTION

An object of the present invention is, therefore, to provide a process measuring device exhibiting a high detection probability in the case of hardware errors.

Statistical analyses of error frequency have shown that especially processors and other highly integrated semiconductor components, for example memories and ASICs, contribute decisively to the statistical total failure rate of a process measuring device.

The object is achieved by a process measuring device having: A first processor, which performs a measured value processing in first processing cycles with a first algorithm; and a second processor, which is mainly responsible for coordination and/or communication;

wherein, additionally, the second processor reads a control data set from the first processor in time intervals greater than the first processing cycle, executes the first algorithm on the basis of the control data set and verifies correct functioning of the first processor.

The first processor is preferably a specialized digital signal processor with very fast processing cycles. The second processor is, for example, a microcontroller, which works significantly slower than the digital signal processor.

The control data set can be, for example, raw measured values of a sensor, and state variables, as well as associated result values calculated therefrom by the first processor. Verification occurs, for example, by direct comparison of the result read from the first processor with the result from execution of the first algorithm by the second processor.

The second processor includes a program memory. Additionally, the second processor, in a further development of the invention, can regularly verify its program memory by means of a test sum or a CRC (Cyclic Redundancy Check).

The second processor further includes a write/read memory, which the second processor, in a further development of the invention, can regularly test for static errors by means of a test pattern.

The second processor includes, moreover, an arithmetic logic unit, and a write/read memory, which the second processor, in a further development of the invention, can regularly check for static errors by means of test algorithms.

In a further development of the invention, the second processor can compare and verify the data in the program memory of the first processor using a locally mirrored memory region.

In one aspect of the invention, the second processor can verify known constants in the data memory of the first processor by comparison with locally mirrored values.

In a further aspect of the invention, the second processor can verify configuration registers of the first processor by comparison with locally mirrored values.

In an embodiment of the invention, the process measuring device includes a 4 ... 20 mA, two-wire interface. Optionally, a watchdog circuit can check the functioning of the second processor and an associated clock, and, in the case of an error, signal an error, independently of the first processor and the second processor, via the 4 ... 20 mA signal current.

BRIEF DESCRIPTION OF THE DRAWINGS

The invention will now be explained on the basis of an example of an embodiment presented in the drawing, the figures of which show as follows.

DESCRIPTION OF THE PREFERRED EMBODIMENTS

Figure 1:
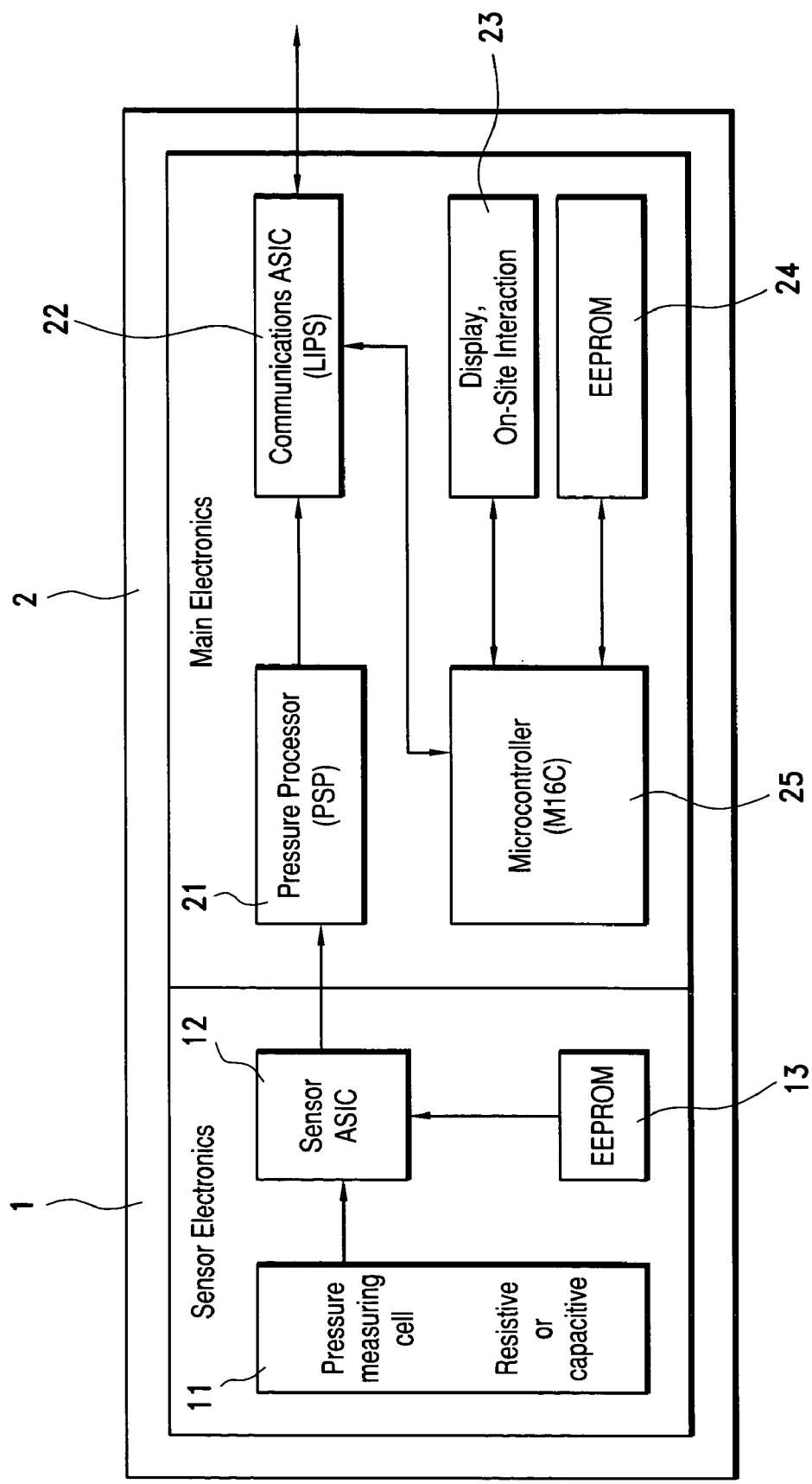
FIG. 1 a block diagram of the device electronics of a pressure sensor of the invention.

The modular device electronics displayed in FIG. 1 for the pressure sensor of the invention includes a sensor electronics 1 and a main electronics 2. The main electronics 2 processes sensor signals, which are received via a serial interface from a sensor electronics.

The sensor electronics includes, in particular, a sensor ASIC 12, whose essential job is to receive pressure, as well as temperature, signals of a pressure measuring cell 11, or primary sensor, and, as required, to condition its signal level. Associated therewith, depending on the measuring principle of the primary sensor, are a current source, in the case of resistive sensors, and a capacitive interface, in the case of capacitive pressure sensors, to which, depending on the application, absolute/relative or difference pressure measuring cells can be connected. The conditioning occurs in the embodiments via adjustable amplifiers, so-called "Programmable Gain Amplifiers" (PGAs), as difference and absolute amplifiers. Thereafter, the conditioned values are analog/digital (A/D) converted and forwarded via a serial interface to the main electronics 2. Sensor-specific data, such as compensation coefficients, etc., are stored in a sensor EEPROM 13.

The ASIC 12 is designed to detect overruns in the internal amplifiers and A/D converters and to report these, likewise via the serial interface, in the form of an error telegram to the main electronics 2.

The main electronics 2 includes essentially the following components:

A pressure processor 21 (ASIC with integrated digital signal processor (DSP)), which acts, among other things, as a serial interface to the sensor electronics 1, receives its raw data, and calculates the output value therefrom. Depending on type of application, the output value can represent either pressure, fill level or flow. The calculated result is provided, for example, as a pulse width modulated signal (PWM). A further functionality of processor 21 is the generating of the clock signal for the entire measurement transmitter electronics.

The main electronics includes, additionally, a communications-ASIC 22; this component serves as the interface of the measurement transmitter to the outside world. Integrated therein is a DC/DC converter for current supply of the entire device and a current regulator, which, from the PWM-signal of the pressure processor places the corresponding electrical current value onto a 4-20 mA current loop. Additionally integrated therein are a HART-modem for communication at the field level, a high accuracy voltage reference and a hardware watchdog.

Additionally, the main electronics includes a microcontroller 25, which is needed for initializing the measurement processor. In controlled operation, the on-site interaction via push-buttons, or remote interaction via HART, as the case may be, is implemented via microcontroller 25. To this end, a display 23 can also be provided.

Other functions of the microcontroller 25 can be, for example, error processing, conversion of measured data into units set by the user, triggering of a watchdog in the communication ASIC, logging of min/max values and of measurement range surpass events, sum counter for the mode "flow rate", and non-volatile data retention.

Pressure processor 21 is an ASIC with an integrated signal processor. Its strength lies in fast and extremely energy-saving calculation of the measured values. At full load, current consumption of the pressure processor amounts to about 600 μA.

Microcontroller 25 is, it is true, in principle, also capable of performing these calculations; however, it would, at equal calculating speed, consume a lot more energy, i.e. too much for a device, which draws its supply from a 4-20 mA current loop. The microcontroller is used for tasks where time-critical calculations are not involved. In this way, it is possible to operate the chip at a sharply reduced clock rate, in order to sink the current consumption to a tolerable level.

In the initializing of the device, attention is to be paid to the following special feature. Since there are a plurality of different sensor assemblies and main electronics variants, it would be too complex to provide a suitable software solution for every possible combination of sensor and electronics. This is avoided by dividing the software into two parts, namely into a sensor-specific part and an application-specific part.

The sensor-specific part is stored in the sensor electronics in a sensor-EEPROM 13. When the sensor electronics receives the first clock signals from the main electronics, it reads its program part from the EEPROM and sends it via the serial connection to the main electronics. There, the sensor program is read from the DSP 21 by the microcontroller 25 and joined with the application-specific program, which it obtains from the program memory of the main electronics. The two program parts are then combined together, i.e. the offsets of the addresses in the memory are so changed, that different variables do not use the same memory regions. Following completion of this process, the now complete program is written back into the DSP. Thereafter, only the configuration parameters of the measurement conversion need to be loaded into the data memory of the DSP. Then the measurement transmitter is ready for use and calculates the measured values from the subsequently arriving, raw data.

The pressure sensors of the invention preferably meet the requirements of functional safety at level SIL 2 according to IEC 61508. This standard sets quantitative requirements regarding minimum values for safety-relevant parameters, such as Safe Failure Fraction (SFF), for the devices. For fulfilling the quantitative requirements (e.g. SFF>90%), as a rule, additional diagnosis measures and monitoring functions are required in the device. Via a FMEDA (Failure Mode, Effects and Diagnostics Analysis) of the electronics at a components level, with subsequent optimizing, the self-monitoring, whose design is described in the following, was identified as a contribution for fulfilling the SIL2 standard. The self-monitoring is composed of a software package, with which, among other things, CRCs (Cyclic Redundancy Checks) and test sums of RAM and ROM of the microcontroller, as well as of the EEPROM are implemented.

Figure 2:
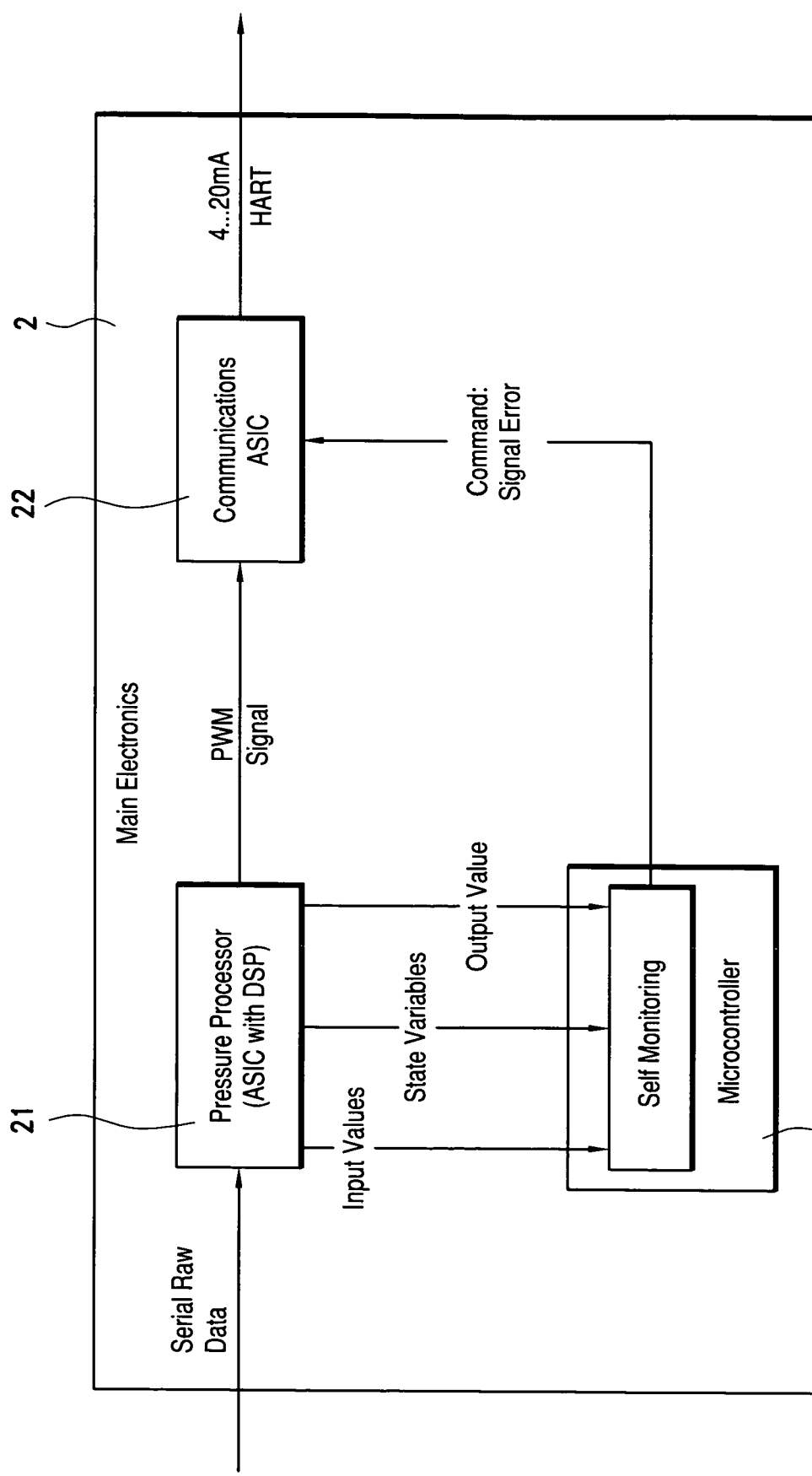
FIG. 2 a block diagram of the self-monitoring.

The self-monitoring includes, furthermore, a random-sampling-type checking of the functioning of the DSP by a control calculation in the microcontroller. For this purpose, as shown in FIG. 2, the input values and state variables, as well as the output value, are read from the DSP 21. From the input values and the state variables, the output value is calculated, which the DSP would output. Then, the measured output value is compared with the calculated output value. If, in doing this, differences are noted, then such is reported to superordinated control instances in the software of the measurement transmitter, and the instances then, on their part, command the communication-ASIC 22 to issue an error signal (HART). On the basis of this signal, the evaluating device, to which the measurement transmitter is connected, recognizes the device error and initiates the necessary measures, such as a report requesting replacement of the defective device.

The DSP 21 in the main electronics performs calculations very quickly. In order, now, to be able to monitor this component, an assembly is needed, which can, at least as quickly, perform the calculations, or at least read-out the data, of the DSP. In the present example of an embodiment, self-monitoring by the microcontroller 25 was selected. This solution includes the control calculation being done by the microcontroller 25. This means no extra hardware is needed and cares, in such case, even with diverse hardware, for an expanded safety. The lower speed of the microcontroller 25 prevents, however, execution of the calculations of the DSP in real-time. This is to be taken into consideration.

Microcontroller 25 performs, therefore, only random sampling. The only time-critical process is, in such case, the reading into the microcontroller 25 of the state variables (intermediately stored values of the last measuring cycle) and the pressure, and temperature, raw data of the sensor electronics, as well as the calculated output value of the DSP 21. The subsequent calculation of the output value in the μC is practically time-independent; thus it can, as often as desired, be interrupted by other program parts.

The self-monitoring is composed mainly of three program parts: A main routine, the registering of the measured values, and an independent calculation with subsequent comparison. The complete self-monitoring is implemented in the form of state machines, wherein, for the registering and the calculating, two separated processes are intentionally used. This enables a different prioritizing of the two processes at the interrupt level. The measured value registration requires a high priority, in order to be able to read-in a complete, valid, data set in the available time. If this process would run at a lower level, the self-monitoring would not function, since, due to interruptions, complete data sets would not be obtained. In contrast therewith, the calculation does not need to have a high priority, since it is not subject to any time pressure.

In the sensor- and application-specific programs, there are, in each case, variables, which contain the values of the previous measurements (damping values, noise filters). In such case, attention is to be paid to the fact that these values change very quickly, since a complete program run-through in the DSP lasts less than 10 ms. For the control calculation, the numerical values at the relevant point in time are required, since, otherwise, a bit-accurate comparison is not possible. This is achieved by rapid reading-in of the variables of concern, using "inline code", that is, with code optimized at the assembler level, which omits call-up of registers and lengthy stack operations.

Each new data packet, which arrives at the DSP, triggers an interrupt, which can also be used for the synchronizing of the self-monitoring. In the interrupt routine, a counter (frame counter) is automatically incremented at each call-up. The reading-in of the status variables at a certain level of the frame counter is integrated as additional functionality.

The measured value registration includes the reading-in of the pressure and temperature values of the sensor-ASIC, the intermediately stored results of the previous calculation, as well as the calculated output value of the DSP. After read-in of the values, it is to be checked, whether the read-in values actually represent the same measuring point in time.

Then, the DSP program is executed by the microcontroller 25, in order to perform the control calculation on the basis of the read-in data. Following the end of the control calculation, a comparison of the calculated and measured values takes place. If the microcontroller finds too great a difference between the calculated and measured values, then the communications-ASIC is directed to output an error current and, as required, also an error report via HART.

The invention claimed is:

1. A process measuring device, comprising:
   a first processor, which performs a measured value processing in first processing cycles with a first algorithm; and
   a second processor, which is responsible for coordination and/or communication tasks, wherein:
   additionally, said second processor, in time intervals, which are greater than the first processing cycle, reads a control data set from said first processor; and
   on the basis of the control data set, executes the first algorithm, in order to verify correct functioning of said first processor.

2. The process measuring device as claimed in claim 1, wherein:
   the control data set contains raw measured values of a sensor and state variables, as well as associated result values calculated therefrom by said first processor.

3. The process measuring device as claimed in claim 1, wherein:
   the verifying occurs by direct comparison of the result read from said first processor with the result of the performing of the first algorithm by said second processor.

4. The process measuring device as claimed in claim 1, wherein:
   said second processor includes a program memory and the program memory is regularly verified by means of a test sum or a CRC.

5. The process measuring device as claimed in claim 1, wherein:
   said second processor further includes a write/read memory, which said second processor can regularly check for static errors by means of test pattern.

6. The process measuring device as claimed in claim 1, wherein:
   said second processor includes a write/read memory, which said second processor can regularly check for static errors by means of test algorithm.

7. The process measuring device as claimed in claim 1, wherein:
   said second processor compares and verifies data in the program memory of said first processor with a locally mirrored, memory range.

8. The process measuring device as claimed in claim 1, wherein:
   said second processor verifies known constants in the data memory of said first processor by comparison with locally mirrored values.

9. The process measuring device as claimed in claim 1, wherein:
   said second processor regularly verifies configuration registers of said first processor by comparison with locally mirrored values.

10. The process measuring device as claimed in claim 1, further comprising:
    a 4 . . . 20 mA, two-wire interface; and
    a watchdog-circuit which checks the functioning of said second processor and an associated clock, and, in the case of error, signals an error via said 4 . . . 20 mA signal current, independently of said first processor and said second processor.

* * * * *